(12) United States Patent
Greenhoe et al.

(10) Patent No.: US 11,443,656 B2
(45) Date of Patent: Sep. 13, 2022

(54) LABEL COMPATIBLE WITH HOLIDAY TESTING

(71) Applicant: Spot Tracker, LLC, Columbia, MS (US)

(72) Inventors: Brian Merle Greenhoe, Hattiesburg, MS (US); Jason Thomas Dunn, Columbia, MS (US)

(73) Assignee: Spot Tracker, LLC, Columbia, MS (US)

( * ) Notice: Subject to any disclaimer, the term of this patent is extended or adjusted under 35 U.S.C. 154(b) by 110 days.

(21) Appl. No.: 16/533,219

(22) Filed: Aug. 6, 2019

(65) Prior Publication Data

US 2020/0066189 A1 Feb. 27, 2020

Related U.S. Application Data

(60) Provisional application No. 62/721,353, filed on Aug. 22, 2018.

(51) Int. Cl.
*G09F 3/00* (2006.01)
*G09F 3/10* (2006.01)
*G09F 3/02* (2006.01)

(52) U.S. Cl.
CPC .............. *G09F 3/0295* (2013.01); *G09F 3/10* (2013.01); *G09F 2003/0241* (2013.01); *G09F 2003/0257* (2013.01)

(58) Field of Classification Search
None
See application file for complete search history.

(56) References Cited

U.S. PATENT DOCUMENTS

| 5,925,431 | A | 7/1999 | Schoenfelder | |
|---|---|---|---|---|
| 2003/0194523 | A1* | 10/2003 | Kume | G09F 3/10 428/40.1 |
| 2005/0057258 | A1 | 3/2005 | Colahan | |
| 2012/0040113 | A1* | 2/2012 | Sato | G09F 3/0297 428/34.1 |
| 2012/0295052 | A1* | 11/2012 | Choi | B32B 7/06 428/40.9 |

FOREIGN PATENT DOCUMENTS

CN 106203570 12/2016

OTHER PUBLICATIONS

European Search Report in Application No. 19191982.8 dated Jan. 16, 2020.

* cited by examiner

*Primary Examiner* — Alicia Chevalier
*Assistant Examiner* — Elaine M Vazquez
(74) *Attorney, Agent, or Firm* — DLA Piper LLP US

(57) ABSTRACT

A label may include an electrically insulating label layer, an electrically conductive backing layer, and an electrically conductive adhesive. The label layer may include a front side including visible and/or scannable information and a back side. The electrically conductive backing layer may extend beyond an outer edge of the label layer in at least one direction parallel to the back side of the label layer. The electrically conductive backing layer may include a front side coupled to the back side of the label layer and a back side. An adhesive may be disposed on the back side of the backing layer.

20 Claims, 6 Drawing Sheets

LABEL COMPATIBLE WITH HOLIDAY TESTING

CROSS REFERENCE TO RELATED APPLICATION

This application claims priority to U.S. Provisional Application No. 62/721,353, entitled "Label Compatible with Holiday Testing," filed Aug. 22, 2018, the entirety of which is incorporated by reference herein.

DETAILED DESCRIPTION OF SEVERAL EMBODIMENTS

Anti-corrosive coatings may be applied to pipes and other metal structures. However, these coatings may themselves erode over time and/or may be applied improperly, exposing the underlying pipe to the environment. To detect gaps or voids in coatings ("holidays"), non-destructive testing ("holiday testing" or "jeeping") may be performed. The holiday testing may include applying an electrical voltage to the structure and detecting a closed electrical circuit (e.g., using a "holiday detector") in areas where there is insufficient coating to resist the electrical voltage. For example, the air within defects may be ionized by a large voltage differential applied by the holiday detector, in the same way that lighting occurs, and the circuit may be completed by a spark. This spark may indicate a holiday, and the area of coating where the spark occurred may be repaired.

Some embodiments disclosed herein may use barcoded or otherwise marked labels to track individual pieces of pipe or other structures. These labels may be applied to the pipe with a layer of conductive material between the pipe and the label. The conductivity of the layer may prevent the label from interfering with the holiday testing by allowing the holiday detector to complete an electrical circuit underneath the label if a holiday is present there.

Figure 1A:
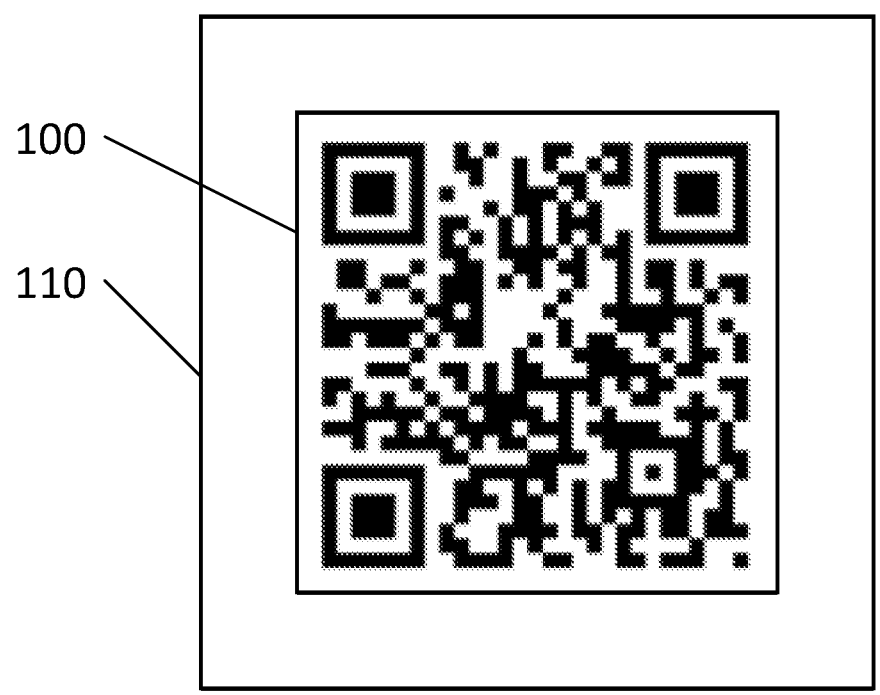
FIG. 1A is a label according to an embodiment of the disclosure.

FIG. 1A is a label 100 according to an embodiment of the disclosure. Specifically, FIG. 1A shows a front view of label 100, where markings (e.g., in the form of a quick response (QR) code) are visible. Label 100 may include any markings, such as scannable codes (e.g., the illustrated QR code, bar codes, etc.), graphics, text, etc. In some embodiments, label 100 may be used to label pipes, although label 100 may be applied to any item in other embodiments. Label 100 may be made of any material or combination thereof. For example, label 100 may be made from polyethylene terephthalate (PET), paper, polyester, polycarbonate, thermal transfer papers, or vinyl. Accordingly, in some embodiments, label 100 may be made from an electrically insulating material, which may include a dielectric material.

Figure 1B:
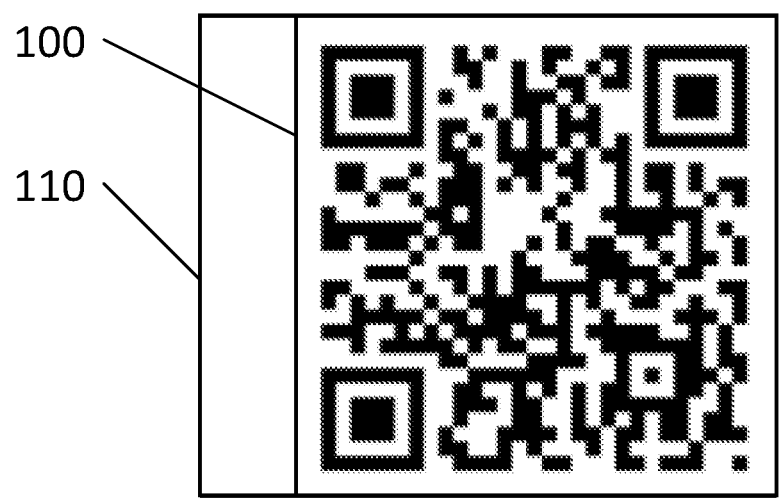
FIG. 1B is a label according to an embodiment of the disclosure.

In some embodiments, label 100 may include conductive backing 110 disposed on a back side of label 100. Conductive backing 110 may be made of any conductive material, such as aluminum, copper, tin, gold, silver, or brass metal foil. Conductive backing 110 may cover the entire back side of label 100 and may extend beyond the edge of label 100 on at least one side. In the embodiment of FIG. 1A, conductive backing 110 extends beyond the edge of label 100 on all sides. FIG. 1B shows an alternative embodiment of label 100 according to an embodiment of the disclosure. In the embodiment of FIG. 1B, conductive backing 110 only extends beyond the edge of label 100 on one side, as shown. Other embodiments may expose portions of conductive backing 110 in other ways, such as by providing a tab of conductive backing 110 that extends beyond a portion of an edge of label 100, providing a hole in label 100 through which conductive backing 110 is exposed, or other configurations.

The electrically insulating label 100 and conductive backing 110 may be formed or assembled, in a process known as converting, to comprise a single unit, wherein label 100 is not removable from backing 110. In some embodiments, this assembly may be die cut by the manufacturer and applied to an easy-peel backer for application by operational field personnel. The easy-peel backer may include wax paper, for example.

Figure 2:
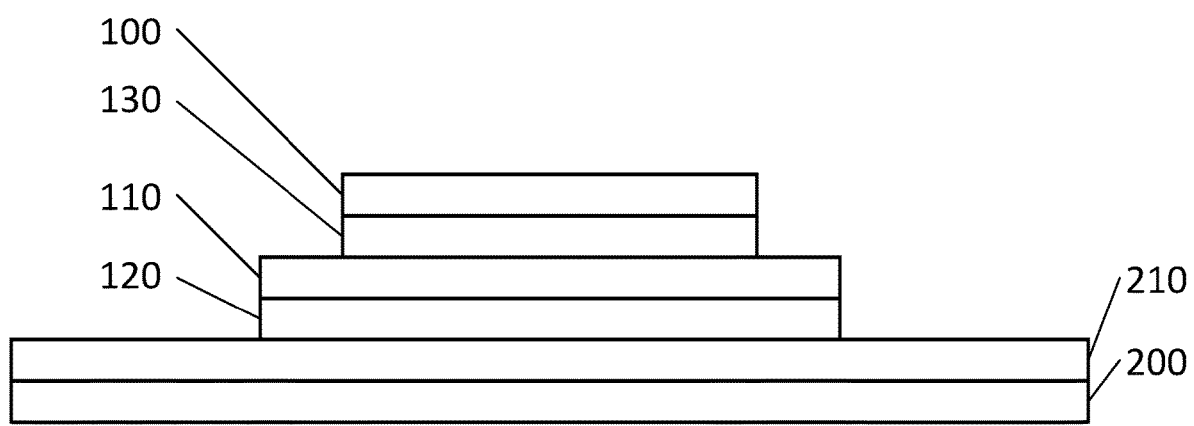
FIG. 2 is a label applied to a structure according to an embodiment of the disclosure.

FIG. 2 shows label 100 applied to a structure according to an embodiment of the disclosure. For example, the structure may include metallic pipe 200 and a protective coating 210. Coating 210 may be electrically insulating (e.g., coating 210 may be made from an electrically insulating material, which may include a dielectric material). Conductive backing 110 may be coated with adhesive 120. Adhesive 120 may include a conductive and/or non-conductive adhesive. For example, conductive adhesive 120 may be a conductive film (e.g., 3M™ XYZ), vail, or mesh that may include a condutcive nano-particle (e.g., silver, nickel, copper, inorganic carbon, etc.), conductive additive (e.g., nickel, copper, carbon black, conductive veil (randomly oriented fiber textile) material, carbon nanotube, graphene, graphene nano-platelets, etc.), or woven or non-woven conductive scrim doped pressure sensitive acrylic adhesive. Conductive adhesive 120 may be configured so that the adhesive 120 is above a conductive threshold concentration resulting in an electrically conductive bulk material property. Examples of non-conductive adhesives 120 may include any adhesives thin enough that a voltage differential used during jeep testing would be sufficient to ionize a conductive pathway through adhesive 120 to reveal holidays located beneath label 100. The thickness of non-conductive adhesive 120 may be less than or equal to two thousandths of an inch but, depending on material, may include adhesive films less than five thousandths of an inch thick. The base chemistry of non-conductive adhesives 120 may include pressure sensitive acrylics, modified acrylics, rubbers, silicone, polyimide, polyamide, epoxy, etc.

In some embodiments, when label 100 is manufactured, adhesive 120 may be applied to conductive backing 110, and an easy-peel backer may be added to cover adhesive 120 for transport (not shown). Accordingly, a person may remove the easy-peel backer and affix backing 110 to coating 210 with adhesive 120. Because conductive backing 110 may extend beyond the edge of label 100 and may cover the entire back side of label 100, there may be no direct contact between the electrically insulating label 100 and the electrically insulating coating 210. Instead, conductive material (e.g., backing 110 and/or adhesive 120) may completely separate the electrically insulating label 100 and the electrically insulating coating 210. As also shown in FIG. 2, label 100 and conductive backing 110 may be coupled to one another by adhesive 130 in some embodiments. For example, adhesive 130 may be an electrically insulating acrylic adhesive in some embodiments.

Figure 3:
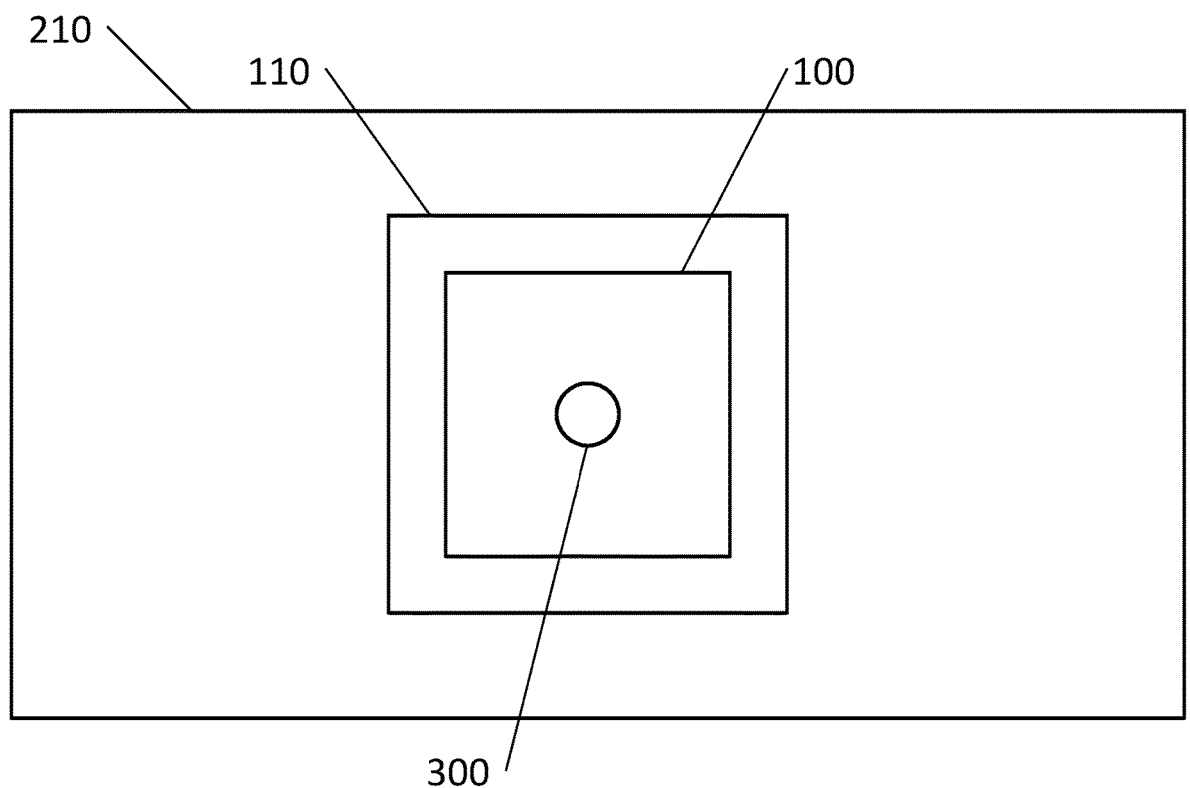
FIG. 3 is a label covering a holiday in a structure according to an embodiment of the disclosure.

FIG. 3 shows label 100 affixed to coating 210 according to an embodiment of the disclosure. In the example of FIG. 3, label 100 is covering a holiday 300 in coating 210. Holiday 300 may form over time and/or may be the result of problems with the application and/or composition of coating 210. Accordingly, the location of holiday 300 may be unpredictable, and, in some cases, label 100 may completely cover holiday 300 as shown.

Figure 4:
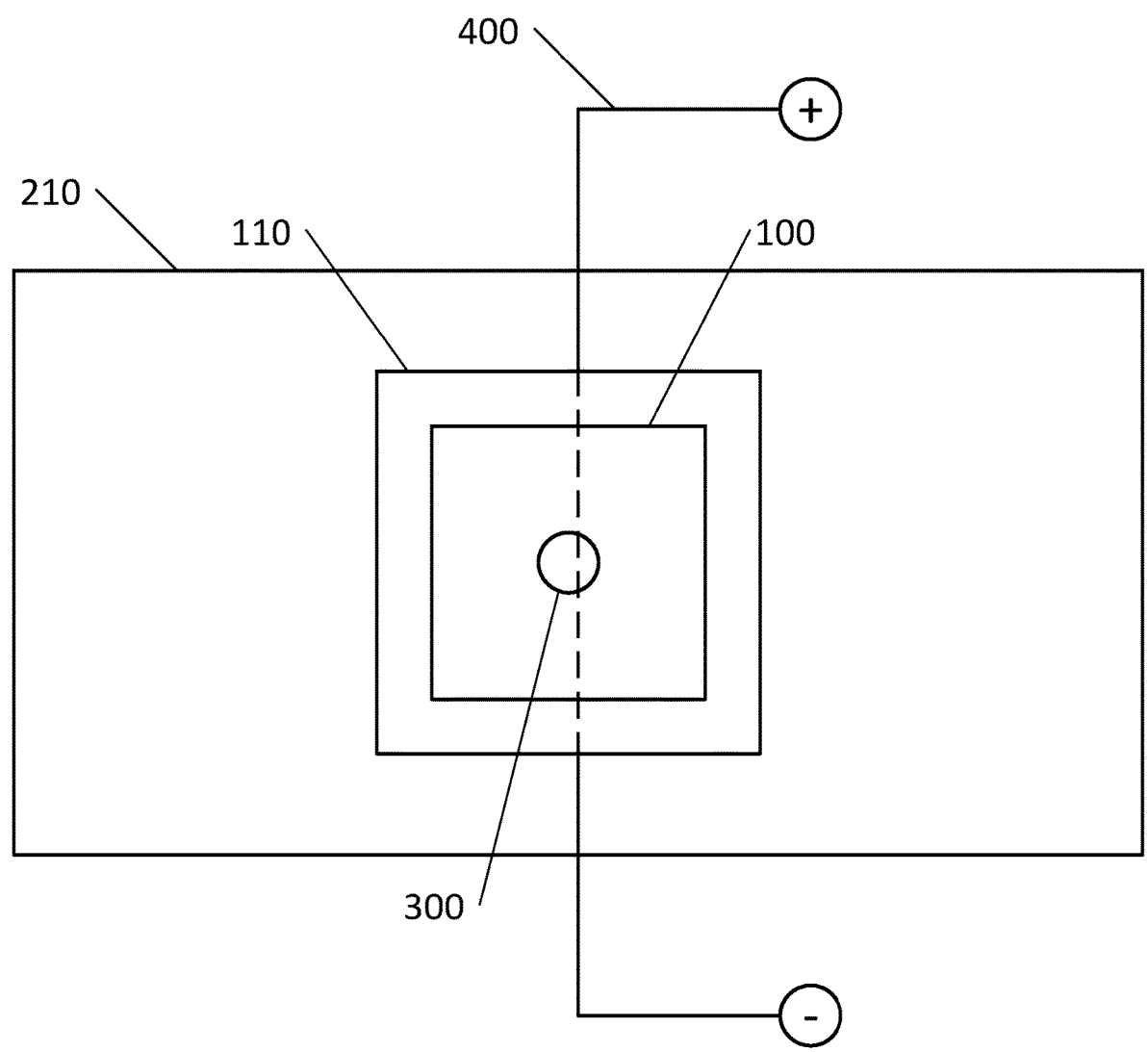
FIG. 4 is a circuit according to an embodiment of the disclosure.

Because conductive material (e.g., backing 110 and/or adhesive 120) may completely separate the electrically insulating label 100 and the electrically insulating coating 210, the presence of label 100 may not impede holiday testing. For example, FIG. 4 shows a circuit 400 according to an embodiment of the disclosure. A holiday detector may apply a voltage, detecting current at the positive and negative nodes of circuit 400 when a holiday is encountered. Because conductive backing 110 is larger than label 100, the border of conductive backing 110 surrounding label 100 may allow the holiday detector to apply a voltage and conduct a current directly under label 100 through circuit 400 and find holiday 300.

Figure 5:
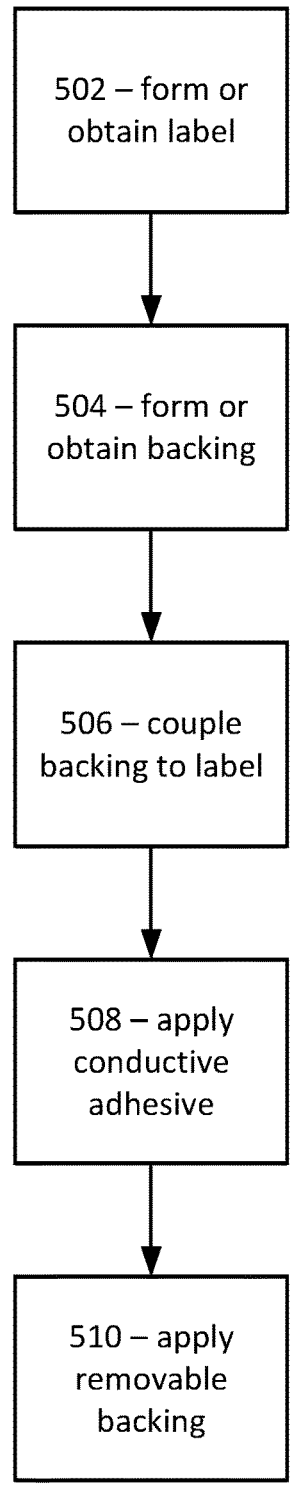
FIG. 5 is a method of manufacturing a label according to an embodiment of the disclosure.

FIG. 5 shows a method 500 of manufacturing a label according to an embodiment of the disclosure. At 502, a manufacturer may form or obtain label 100 (e.g., the insulating layer with information printed or otherwise disposed thereon). At 504, the manufacturer may form or obtain backing 110 (e.g., the conductive layer). At 506, the manufacturer may couple a front side of backing 110 to a back side of label 100 so that backing 110 extends beyond an outer edge of label 100 in at least one direction parallel to the back side of label 100. The coupling may include applying adhesive 130 to label 100 and/or backing 110 and pressing label 100 and backing 110 together. At 508, the manufacturer may apply conductive adhesive 120 to the back side of backing 110. At 510, the manufacturer may apply a removable backing (e.g., the easy-peel backing described above) to cover the conductive adhesive 120.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A label comprising:
   an electrically insulating label layer including a front side with visible and/or scannable information disposed thereon and a back side, the label layer forming an interior of a perimeter of a plurality of outer edges;
   an electrically conductive backing layer extending beyond at least one of the plurality of outer edges of the label layer in at least one direction away from the interior and parallel to the back side of the label layer, the backing layer including a front side directly coupled to the back side of the label layer and a back side; and
   an adhesive disposed directly on the back side of the backing layer.

2. The label of claim 1, wherein the label layer is made of at least one of polyethylene terephthalate (PET), paper, polyester, polycarbonate, thermal transfer paper, and vinyl.

3. The label of claim 1, wherein the backing layer extends beyond the plurality of outer edges of the label layer in every direction away from the interior and parallel to the back side of the label layer.

4. The label of claim 1, wherein the backing layer is made of a foil comprising at least one of aluminum, copper, tin, gold, silver, or brass.

5. The label of claim 1, wherein the adhesive includes at least one of a conductive acrylic film, a vail, or a mesh.

6. The label of claim 1, wherein the adhesive includes at least one of a metal nano-particle doped pressure sensitive acrylic adhesive, a woven doped pressure sensitive acrylic adhesive, and non-woven conductive scrim doped pressure sensitive acrylic adhesive.

7. The label of claim 1, wherein the adhesive includes at least one of a pressure sensitive acrylic, a modified acrylic, a rubber, a silicone, a polyimide, a polyamide, and an epoxy.

8. The label of claim 1, further comprising a second adhesive coupling the label layer and the backing layer.

9. The label of claim 8, wherein the second adhesive is electrically insulating.

10. The label of claim 1, further comprising a removable backing covering the adhesive.

11. A method of manufacturing a label comprising:
    coupling a front side of an electrically conductive backing layer directly to a back side of an electrically insulating label layer, the label layer forming an interior of a perimeter of a plurality of outer edges, so that the backing layer extends beyond at least one of the plurality of outer edges of the label layer in at least one direction away from the interior and parallel to the back side of the label layer, wherein:
    the label layer includes a front side with visible and/or scannable information disposed thereon and the back side, and
    the backing layer includes the front side and a back side; and
    applying an adhesive directly to the back side of the backing layer.

12. The method of claim 11, further comprising forming the label layer of at least one of polyethylene terephthalate (PET), paper, polyester, polycarbonate, thermal transfer paper, and vinyl.

13. The method of claim 11, wherein the backing layer is coupled to the label layer to extend beyond the plurality of outer edges of the label layer in every direction away from the interior and parallel to the back side of the label layer.

14. The method of claim 11, further comprising forming the backing layer of a foil comprising at least one of aluminum, copper, tin, gold, silver, or brass metal.

15. The method of claim 11, wherein the adhesive includes at least one of a conductive acrylic film, a vail, or a mesh.

16. The method of claim 11, wherein the adhesive includes at least one of a metal nano-particle doped pressure sensitive acrylic adhesive, a woven doped pressure sensitive acrylic adhesive, and non-woven conductive scrim doped pressure sensitive acrylic adhesive.

17. The method of claim 11, wherein the adhesive includes at least one of a pressure sensitive acrylic, a modified acrylic, a rubber, a silicone, a polyimide, a polyamide, and an epoxy.

18. The method of claim 11, wherein the coupling includes applying a second adhesive between the label layer and the backing layer.

19. The method of claim 18, wherein the second adhesive is electrically insulating.

20. The method of claim 11, further comprising applying a removable backing to cover the adhesive.

\* \* \* \* \*